(12) United States Patent
Woo et al.

(10) Patent No.: US 12,392,633 B2
(45) Date of Patent: Aug. 19, 2025

(54) AUGMENTED REALITY BASED POINT OF INTEREST GUIDE DEVICE AND METHOD

(71) Applicants: Hyundai Motor Company, Seoul (KR); Kia Corporation, Seoul (KR)

(72) Inventors: Seunghyun Woo, Seoul (KR); Jae Yul Woo, Seoul (KR); Rowoon An, Seoul (KR); Soobin Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 389 days.

(21) Appl. No.: 17/830,504

(22) Filed: Jun. 2, 2022

(65) Prior Publication Data

US 2022/0397413 A1     Dec. 15, 2022

(30) Foreign Application Priority Data

Jun. 15, 2021   (KR) .................. 10-2021-0077277

(51) Int. Cl.
   *G01C 21/36*   (2006.01)
   *G01C 21/34*   (2006.01)
   *G06F 3/0486*  (2013.01)

(52) U.S. Cl.
   CPC ..... *G01C 21/3682* (2013.01); *G01C 21/3476* (2013.01); *G01C 21/3638* (2013.01); *G01C 21/365* (2013.01); *G01C 21/3664* (2013.01); *G01C 21/367* (2013.01); *G06F 3/0486* (2013.01)

(58) Field of Classification Search
   CPC ............ G01C 21/3476; G01C 21/3638; G01C 21/365; G01C 21/3664; G01C 21/367; G01C 21/3682; G06F 3/0486
   See application file for complete search history.

(56) References Cited

U.S. PATENT DOCUMENTS

| | | | |
|---|---|---|---|
| 9,269,011 B1 * | 2/2016 | Sikka ................ | G06V 20/20 |
| 10,147,399 B1 * | 12/2018 | Mott ................. | G06V 20/10 |
| 10,740,975 B2 * | 8/2020 | Wu .................... | G06T 19/006 |
| 2007/0288511 A1 * | 12/2007 | Zink ................. | G06F 16/909 |
| 2011/0071757 A1 * | 3/2011 | Lee ................... | H04N 23/61 |
| | | | 701/532 |
| 2011/0313779 A1 * | 12/2011 | Herzog ............. | G06Q 30/02 |
| | | | 715/744 |
| 2012/0038671 A1 * | 2/2012 | Min .................. | G06T 19/00 |
| | | | 345/633 |
| 2012/0223966 A1 * | 9/2012 | Lim ................... | G06T 11/60 |
| | | | 345/633 |

(Continued)

FOREIGN PATENT DOCUMENTS

| | | | | |
|---|---|---|---|---|
| CN | 107396309 A | * | 11/2017 | ............... G01S 5/14 |
| CN | 108490392 A | * | 9/2018 | ............... G01S 5/14 |

(Continued)

*Primary Examiner* — Dino Kujundzic
(74) *Attorney, Agent, or Firm* — SLATER MATSIL, LLP

(57) ABSTRACT

An embodiment augmented reality (AR)-based point of interest (POI) guide method includes performing a plane detection with respect to an actual image in an area around a POI, forming a grid in the area where the plane detection of the actual image is performed, and displaying an anchor and a highlight at a position of the POI based on the grid.

18 Claims, 8 Drawing Sheets

(56) References Cited

U.S. PATENT DOCUMENTS

| | | | |
|---|---|---|---|
| 2014/0129976 A1* | 5/2014 | Beaurepaire | G01C 21/367 |
| | | | 715/788 |
| 2014/0306996 A1* | 10/2014 | Cao | G06T 19/006 |
| | | | 345/633 |
| 2020/0020001 A1* | 1/2020 | Singh | H04W 4/021 |
| 2020/0264007 A1* | 8/2020 | Yoo | G06T 7/74 |
| 2021/0233496 A1* | 7/2021 | Babu JD | G06F 3/013 |
| 2023/0047992 A1* | 2/2023 | Foccaert | G01S 3/801 |
| 2023/0417567 A1* | 12/2023 | Waldman | G01C 21/3682 |

FOREIGN PATENT DOCUMENTS

| | | | | |
|---|---|---|---|---|
| CN | 108694401 A | * | 10/2018 | G06K 9/00523 |
| CN | 109545071 A | * | 3/2019 | |
| CN | 111683338 B | * | 9/2022 | G01S 19/14 |
| JP | 2011058843 A | * | 3/2011 | |
| KR | 20220075795 A | * | 6/2022 | |
| KR | 20220160279 A | * | 12/2022 | |

* cited by examiner (202)

(204)

(206)

AUGMENTED REALITY BASED POINT OF INTEREST GUIDE DEVICE AND METHOD

CROSS-REFERENCE TO RELATED APPLICATIONS

This application claims the benefit of Korean Patent Application No. 10-2021-00777, filed on Jun. 15, 2021, which application is hereby incorporated herein by reference.

TECHNICAL FIELD

The disclosure relates to a point of interest (POI) guide.

BACKGROUND

Augmented reality (AR) is a technology that shows an image by superimposing a two-dimensional or three-dimensional virtual world image on a real world image. Although AR serves to supplement the real world with a virtual world using a virtual environment created with computer graphics, a real environment is primary. Computer graphics are used to provide additional information required for the real environment, and blur a distinction between the real environment and the virtual image by overlapping the three-dimensional virtual image on an actual image viewed by a user. AR technology which allows combination of the real environment and virtual objects provides better realism and additional information by enabling users to see the real environment. For instance, when a user photographs a street using a camera installed in a mobile device such as a cell phone, information about buildings on the street in the image captured by the camera, e.g., a location, telephone number of the buildings, and the like, is displayed on the image.

An example of services using AR is to guide a route to a destination and, when the destination is reached, inform the location of the destination by displaying an anchor on the destination in the image. In displaying a specific position using an anchor, the accuracy of a position of the anchor is crucial.

SUMMARY

The disclosure relates to a point of interest (POI) guide. Particular embodiments relate to a guide of a POI registered in advance through a mobile device.

An embodiment of the disclosure provides an augmented reality (AR)-based point of interest (POI) guide device and method that may improve an accuracy of indication of a POI.

Additional embodiments of the disclosure will be set forth in part in the description which follows and, in part, will be obvious from the description, or may be learned by practice of the disclosure.

According to an embodiment of the disclosure, there is provided an augmented reality (AR)-based point of interest (POI) guide method including performing a plane detection with respect to an actual image around a POI, forming a grid in an area where the plane detection of the actual image is performed, and displaying an anchor and a highlight at a position of the POI based on the grid.

The method further comprises displaying a tag including additional related information for each category of the POI.

The AR-based POI guide method further includes evaluating an accuracy of a position indication of the POI according to a preset evaluation criterion, wherein the preset evaluation criterion is at least one of a distance, a feature point, and an area.

The distance of the preset evaluation criterion is a distance between a position where the anchor is created and a device that performs an anchoring operation, and a position of the anchor and the highlight is evaluated to be more accurate when the distance is within a preset range.

The feature point of the preset evaluation criterion is a number of feature points on a background image of a position where the anchor is created, and a position of the anchor and the highlight is evaluated to be more accurate, as the number of feature points increases.

The area of the preset evaluation criterion is an area where the plane detection is performed with respect to a surrounding area of the anchor, and a position of the anchor and the highlight is evaluated to be more accurate, as the area increases.

When a search result of the POI is displayed, an evaluation result according to the preset evaluation criterion is displayed as related information of the POI.

The AR-based POI guide method further includes inducing crowdsourcing for a position correction through a predetermined reward, wherein the position correction is performed by adjusting a position of the anchor by a user in a drag and drop manner.

The AR-based POI guide method further includes inducing crowdsourcing for a position correction through a predetermined reward, wherein the position correction is performed by directly inputting an address or an image of the POI by a user.

The AR-based POI guide method further includes inducing crowdsourcing for a position correction through a predetermined reward, wherein the position correction is performed by removing the highlight of the POI through gamification and setting a new position of the POI.

According to an embodiment of the disclosure, there is provided an AR-based POI guide device including a display module provided to display an AR-based image and a processor configured to perform a plane detection with respect to an actual image around a POI, form a grid in an area where the plane detection of the actual image is performed, and control the display module to display an anchor and a highlight at a position of the POI based on the grid.

The processor is further configured to display a tag including additional related information for each category of the POI.

The processor is configured to evaluate an accuracy of a position indication of the POI according to a preset evaluation criterion, and the preset evaluation criterion is at least one of a distance, a feature point, and an area.

The distance of the preset evaluation criterion is a distance between a position where the anchor is created and a device that performs an anchoring operation, and a position of the anchor and the highlight is evaluated to be more accurate when the distance is within a preset range.

The feature point of the preset evaluation criterion is a number of feature points on a background image of a position where the anchor is created, and a position of the anchor and the highlight is evaluated to be more accurate, as the number of feature points increases.

The area of the preset evaluation criterion is an area where the plane detection is performed with respect to a surrounding area of the anchor, and a position of the anchor and the highlight is evaluated to be more accurate, as the area increases.

When a search result of the POI is displayed, the processor is configured to control the display module to display an evaluation result according to the preset evaluation criterion as related information of the POI.

The processor is configured to induce crowdsourcing for a position correction through a predetermined reward, and the position correction is performed by adjusting a position of the anchor by a user in a drag and drop manner.

The processor is configured to induce crowdsourcing for a position correction through a predetermined reward, and the position correction is performed by directly inputting an address or an image of the POI by a user.

The processor is configured to induce crowdsourcing for a position correction through a predetermined reward.

BRIEF DESCRIPTION OF THE DRAWINGS

These and/or other embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Figure 1:
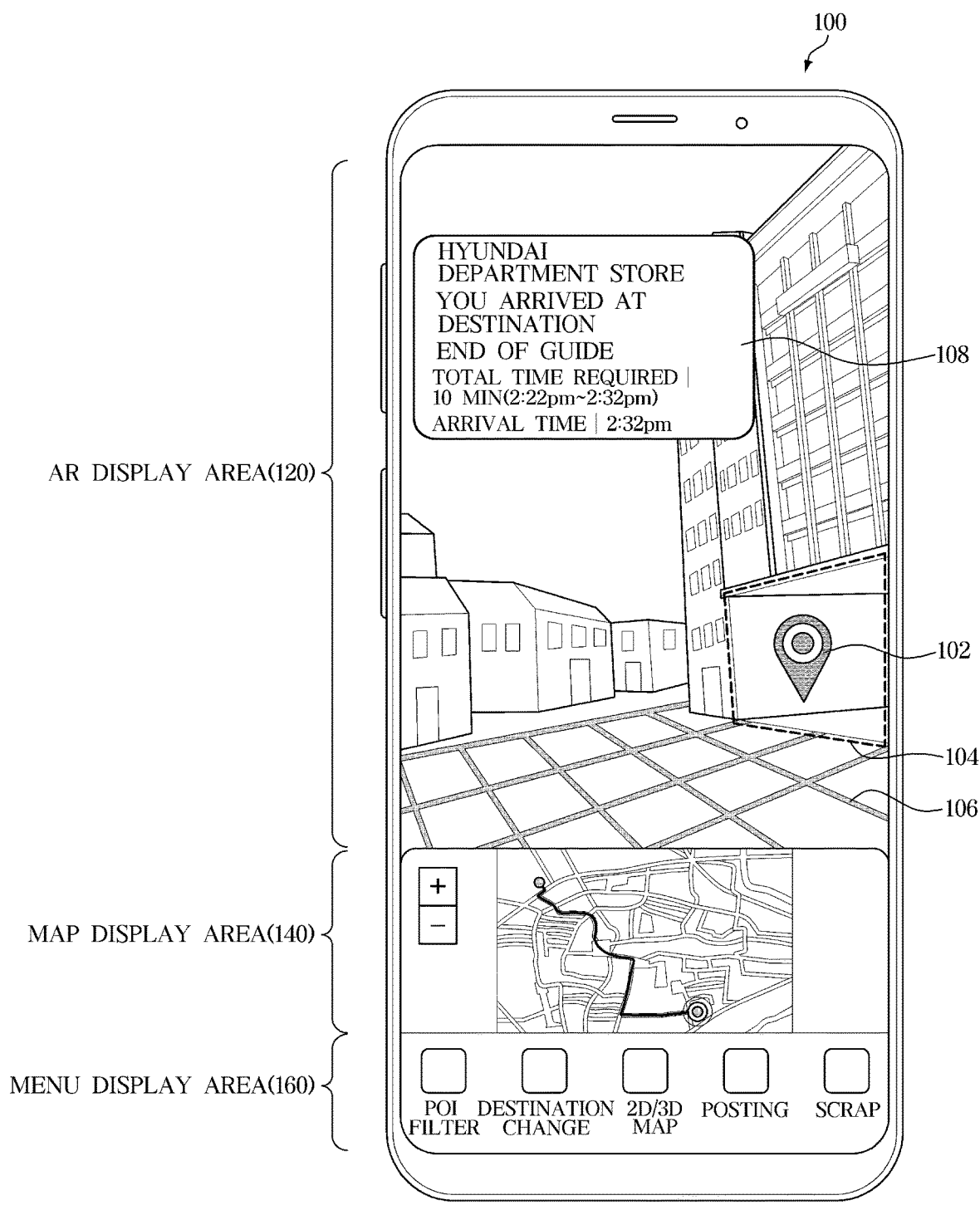
FIG. 1 is a diagram illustrating a screen displaying an arrival of a destination in a mobile device according to an embodiment.

FIG. 1 is a diagram illustrating a screen displaying an arrival of a destination in a mobile device according to an embodiment.

The mobile device according to an embodiment is an augmented reality (AR)-based point of interest (POI) guide device. AR is a technology that shows an image by superimposing a two-dimensional (2D) or three-dimensional (3D) virtual world image on a real world image (i.e., an actual image). The mobile device of FIG. 1 may include a display module for an AR-based POI guide. The images of FIGS. 1 to 8 may be displayed on the display module. Also, the mobile device according to an embodiment may include a processor provided to perform calculations and data processing for realization of AR.

For example, when a user sets a condition of a POI, the mobile device according to an embodiment displays POIs corresponding to the set condition and information about the POIs in a form of AR through the display module. Accordingly, the user may acquire various information about the POI through the mobile device according to an embodiment. Also, the mobile device according to an embodiment guides a route to a specific POI from a current position of the user, and when the POI is reached, displays an anchor on the POI. The user may recognize that the user is close to the POI or has arrived at the POI through the anchor displayed on the display module of the mobile device according to an embodiment.

As shown in FIG. 1, a display area of the mobile device 100 according to an embodiment includes an AR display area 120, a map display area 140 and a menu display area 160.

In the AR display area 120, an anchor 102, a highlight 104, a grid 106 and a POI tag 108 are overlaid on an image of a real world.

A position of the anchor 102 indicates a position of a POI. The highlight 104 in a shape of a box is for indicating the position of the POI more accurately.

An effect of the highlight 104 may be enhanced by the grid 106 created on a bottom surface of the image of the real world. That is, the position of the POI pointed to by the anchor 102 may be indicated more accurately by displaying the grid 106 and displaying the highlight 104 in the shape of a box on coordinates created by the grid 106. In this instance, the POI pointed to by the anchor 102 may be indicated more clearly by increasing a transparency of an inside of the highlight 104 and decreasing a transparency of an outside of the highlight 104. The highlight 104 and the grid 106 may be created above and on a bottom surface that is identified through plane detection used in an AR technology.

The POI tag 108 indicates information about a name of a final destination, whether the user has arrived at the final destination (POI), a total time required, and the like. The total time required may further include information about a departure time and an arrival time. When a navigation mode is switched to an AR mode, the total time required may be calculated using a mode switching point in time as the departure time. By contrast, when the mobile device initially starts in the AR mode, not switching to the AR mode from the navigation mode, the total time required may be calculated using a point in time that the user starts moving, after designating the final destination, as the departure time. A time may be displayed in a 12-hour system (with AM/PM notation) or 24-hour system. The total time required may be calculated in different ways according to the switching of mode. For instance, when the navigation mode is switched to the AR mode, the total time required may be a period of time to the arrival time from a point in time when switching to the AR mode. When starting in the AR mode from the departure time, a period of time to the arrival time from a point in time when setting the destination in the AR mode may be the total time required. Also, when an initial destination is changed midway, a period of time to the arrival time from a point in time when changing the destination may be the total time required.

In addition, an arrival at the POI may be displayed through the anchor 102, the highlight 104 and the grid 106, when accessing to a predetermined distance (e.g., 50 m) from the POI and before a predetermined time (e.g., 5 minutes) prior to the arrival at the POI.

Further, additional information according to a category of the POI may be displayed in the AR display area 120. For example, when the POI is a parking lot, information about business days, business hours, parking fees, and a current utilization rate of the parking lot may be displayed in the AR display area 120.

In the map display area 140, a map, a current position, a starting position, a movement route (trajectory), a map zoom in/out button, a direction indicator, and the like may be displayed. The direction indicator includes a function to rotate a map. The map display area 140 may be activated when the user approaches within a predetermined distance from the POI. Alternatively, the map display area 140 may be constantly maintained in an activated state.

In the menu display area 16o, a plurality of menu buttons may be displayed. A function of a corresponding menu button may be performed by touching a desired one of the plurality of menu buttons by the user. The plurality of menu buttons may include a POI filter, destination change, a 2D map (3D map), posting, and scrap. The POI filter is a button for displaying only a POI that satisfies a specific condition among a plurality of registered POIs. The destination change is a button for changing a currently designated destination to another POI. The 2D map (3D map) is a button for enabling a 2D or 3D map displayed in the map display area 140 to be switched to 3D or 2D map, respectively. The posting is a button for posting the POI to an online community or a social media platform. The scrap is a button for saving the POI to reference the POI later.

As shown in FIG. 1, an accuracy of position indication of a tool for displaying the POI, e.g., the anchor 102, is critical in displaying the POI through AR. When the anchor 102 indicates an approximate position of the POI, confusion may be caused. Accordingly, hereinafter, various embodiments of a method for improving an accuracy of an AR-based POI position indication in the mobile device according to an embodiment are described in detail with reference to FIGS. 2 to 8.

Figure 2:
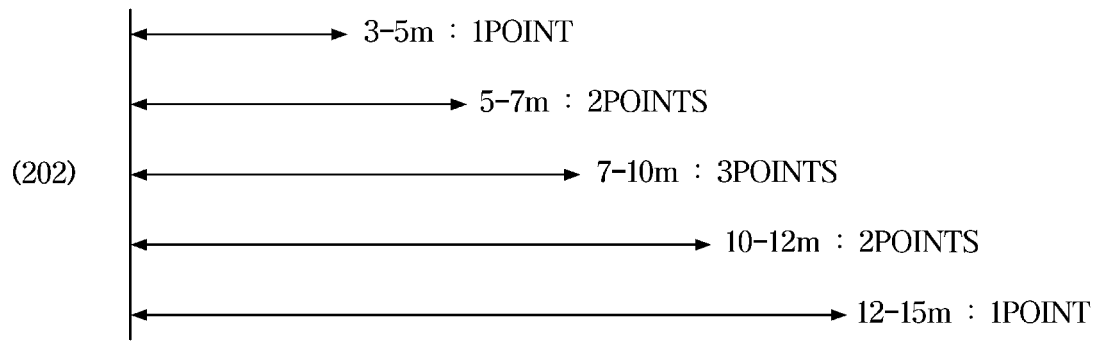
FIG. 2 is a diagram illustrating a determination on an accuracy of position indication of an augmented reality (AR)-based point of interest (POI) in a mobile device according to an embodiment.
Figure 2:
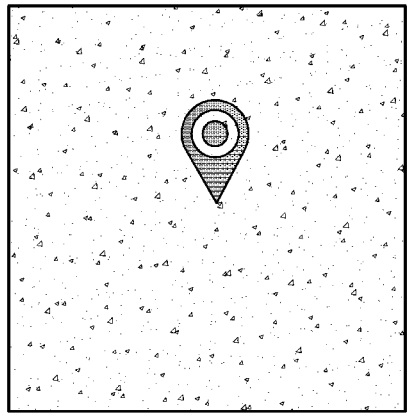
Figure 2:
Figure 2:
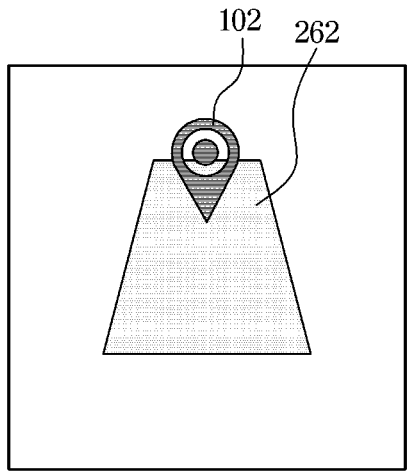
Figure 2:
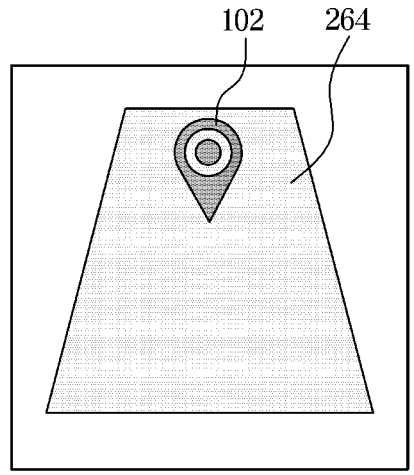

FIG. 2 is a diagram illustrating a determination on an accuracy of a position indication of an AR-based POI in a mobile device according to an embodiment. That is, the accuracy of the position indication of the AR-based POI may be improved by evaluating a quality of the anchor 102 based on a predetermined quantitative evaluation criterion.

As shown in reference numeral 202 of FIG. 2, the quantitative evaluation criterion may be a distance between a position where the anchor 102 is created and the mobile device 100 that performs an anchoring operation. That is, a specific distance that shows a highest accuracy with respect to a position of the anchor 102 may be obtained through an experiment of measuring the accuracy of the anchor 102 at each distance by changing the distance from the position where the anchor 102 is created to the mobile device 100 that performs the anchoring operation. The quality of the anchor 102 may be quantitatively evaluated by providing points according to the distance described above for all anchors 102 that are actually created. For example, through the experiment, when the highest accuracy of the anchor 102 is obtained at a distance between 7 m and 10 m, the highest 3 points may be given to all anchors 102 created at the distance between 7 m and 10 m. In this instance, a relatively low 2 points may be given with respect to a distance between 5 m and 7 m or between 10 m and 12 m. Also, 1 point may be given with respect to a distance between 3 m and 5 m or a distance between 12 m and 15 m. For other distances, 0 points may be given.

As shown in reference numeral 204 of FIG. 2, another quantitative evaluation criterion may be the number of feature points on a background image. Here, the number of feature points is identified through a plane detection at the position where the anchor 102 is created. Like a left image of reference numeral 204 of FIG. 2, when a relatively monotonous pattern is repetitive and the number of feature points is small, an anchoring quality is relatively low. Accordingly, when the number of feature points is small, a lower point is given. By contrast, like a right image of reference numeral 204 of FIG. 2, when a pattern is relatively less repetitive and the number of feature points is large, an anchoring quality is relatively high. Accordingly, more points are given to the anchor 102 having a relatively large number of feature points.

As shown in reference numeral 206 of FIG. 2, still another quantitative evaluation criterion may be an area where the plane detection is performed with respect to a surrounding area of the anchor 102. A current position may be identified more easily according to an area where the plane detection is completed with respect to the surrounding area of the anchor 102, and thereby may improve the quality of the anchor 102. That is, a relatively low point value is given to the anchor 102 having a relatively small plane detection area 262 like a left image of reference numeral 206 of FIG. 2. By contrast, more points are given to the anchor 102 having a relatively large plane detection area 264 like a right image of reference numeral 206 of FIG. 2.

Figure 3:
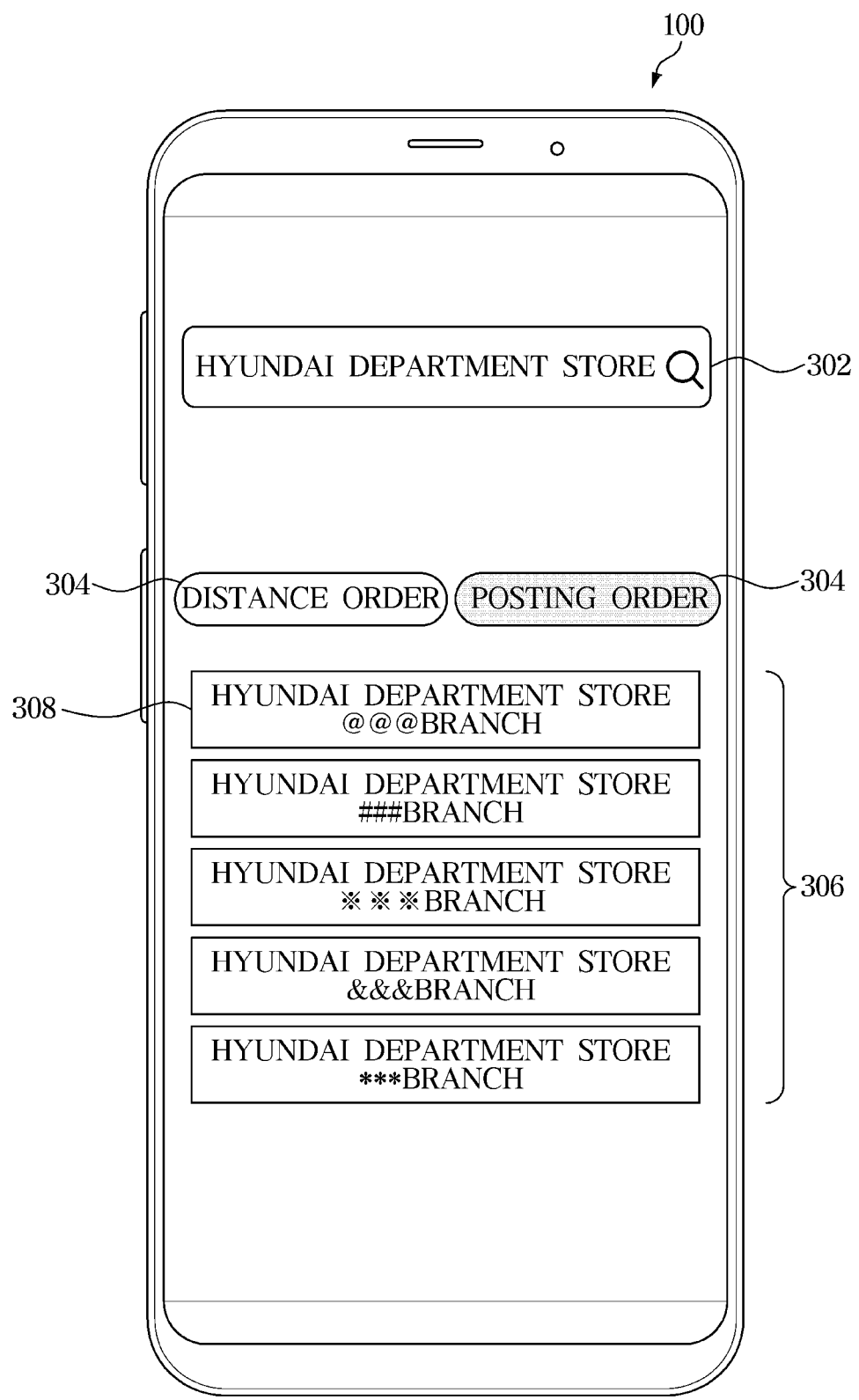
FIG. 3 is a diagram illustrating search results of an AR-based POI in a mobile device according to an embodiment.
Figure 4:
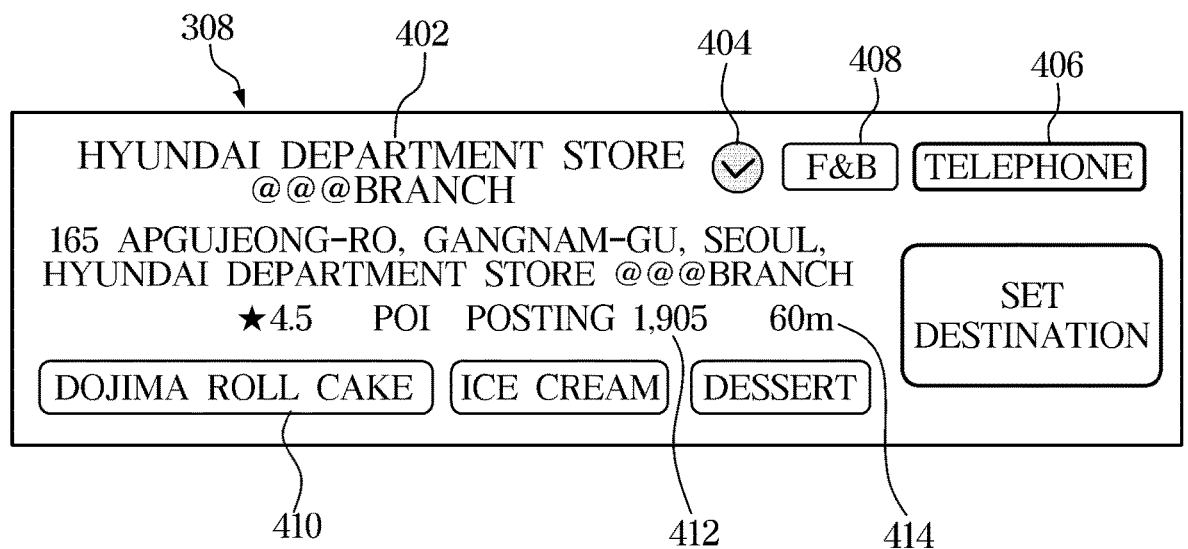
FIG. 4 is a diagram illustrating details of one of the search results of FIG. 3 according to an embodiment.

FIG. 3 is a diagram illustrating search results of an AR-based POI in a mobile device according to an embodiment. FIG. 4 is a diagram illustrating details of one of the search results of FIG. 3 according to an embodiment.

As shown in FIG. 3, a search box 302, sort criteria 304 and search results 306 are displayed on a display module of the mobile device 100 according to an embodiment.

A user may input a name of a POI to be searched for in the search box 302. The search results 306 are sorted and displayed according to the preset sort criteria 304. The preset sort criteria 304 may be one of a distance order or a posting order. With respect to the distance order, search results are arranged in an order of nearest to farthest from a current position of the mobile device 100. Alternatively, with respect to the distance order, search results within a predetermined area centered on the current position on a 2D map activated on the mobile device 100 may be displayed in order of relevance. With respect to the posting order, search results are arranged in an order of greatest number of posts for the POI. In particular, search results may be arranged in an order of greatest number of posts for the POI in relation to crowdsourcing. In FIG. 3, a search word is 'HYUNDAI department store', and a sort order (the sort criteria 304) is the 'posting order'. FIG. 3 illustrates that the search results 306 which are POIs related to 'HYUNDAI department store' are arranged in the posting order. When the 2D map is activated on the display module of the mobile device 100, corresponding POIs on the currently activated 2D map are searched and displayed. In this instance, search results may be arranged in the order of nearest to farthest on the activated 2D map or in order of relevance.

FIG. 4 illustrates details of a search result 308 located at the top among the search results of FIG. 3. As shown in FIG. 4, in the search result 308 about a single POI, a name 402 of the POI (HYUNDAI department store @@@ branch) and an accuracy 404 of the POI are displayed. The accuracy 404 shown in FIG. 4 indicates that a search word and a name of the search result match above a predetermined level.

A reference numeral 406 of FIG. 4 indicates a telephone link button. When a user touches the telephone link button, dialing to the POI (HYUNDAI department store @@@ branch) is immediately executed.

A reference numeral 408 indicates a category of the POI. 'F&B' which stands for the food and beverage industry is displayed in FIG. 4. In this instance, related hashtags 410 may be displayed according to the category. In FIG. 4, 'dojima roll cake', 'ice cream' and 'dessert' are displayed in FIG. 4 as the hashtags 410 related to the food and beverage industry. The hashtags 410 displayed may be a few top-ranked hashtags (e.g., 3 top-ranked hashtags) among hashtags provided by users.

Also, the number of postings 412 about the POI and a distance 414 to the POI may be displayed in the search result 308.

Figure 5:
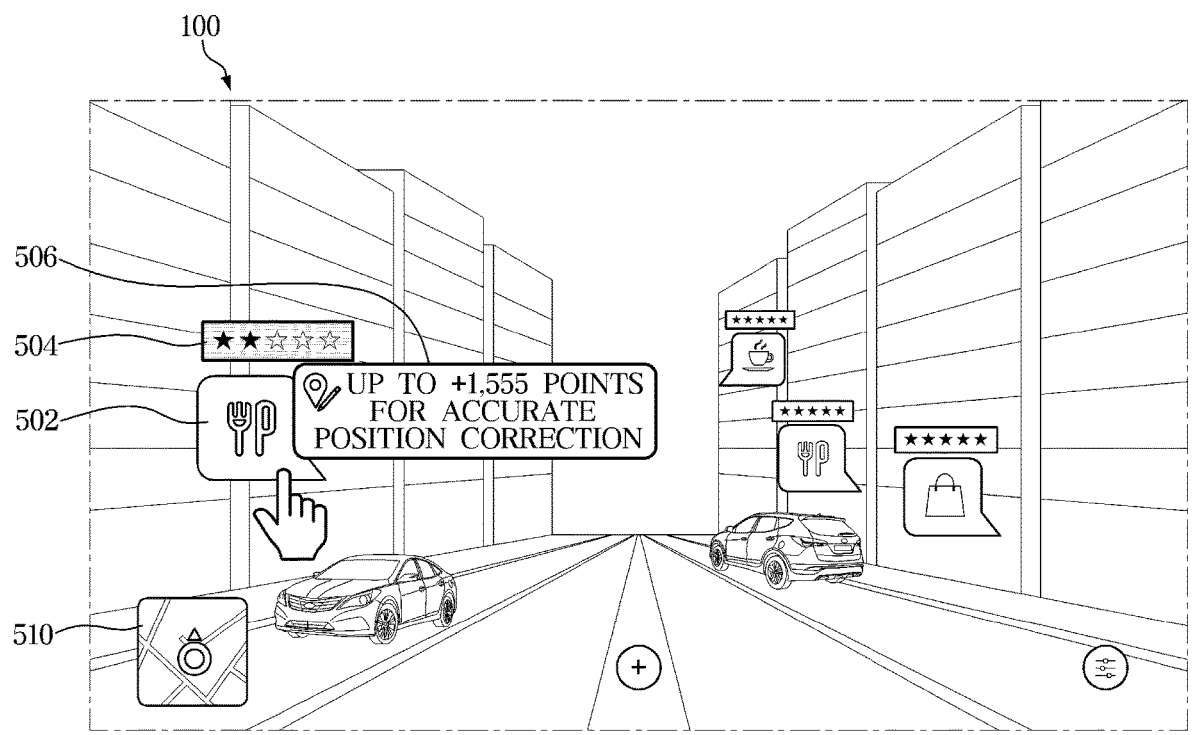
FIG. 5 is a diagram illustrating a first embodiment for improving an accuracy of a POI in a mobile device according to an embodiment.

FIG. 5 is a diagram illustrating a first embodiment for improving an accuracy of a POI in a mobile device according to an embodiment. In particular, FIG. 5 illustrates an example of position correction of a POI by inducing crowdsourcing (or crowd sourcing) through a predetermined reward.

As shown in FIG. 5, when a crowdsourcing editing mode is executed in an AR guide service in the mobile device 100 according to an embodiment, an anchor 502 of the POI whose point is low (less than a preset value) among POIs around a current position and points 504 (classified by a star rating) of the POI are displayed. Also, as indicated by a reference numeral 506, through a guide message for inducing crowdsourcing, it may be guided to additionally provide a predetermined point (e.g., 1,555 points), when a user accurately corrects a position of the POI. A position of the anchor 502 may be basically corrected by the user in a drag and drop manner. In addition, a tag position may be corrected by manipulation of a direction key 510 more precisely. A compass icon indicating a direction on a map may be used as the direction key 510.

When the position correction of the POI is made through crowdsourcing, a reward may be provided to the user according to a predetermined standard. For example, a preset point may be provided when the position correction is made in the drag and drop manner, and when the position correction is made more precisely by using the direction key 510, more points may be provided than for the position correction made in the drag and drop manner. Further, a reward may be provided when the position correction is made by inputting additional information related to the POI, which is described in greater detail with reference to FIG. 6.

Figure 6:
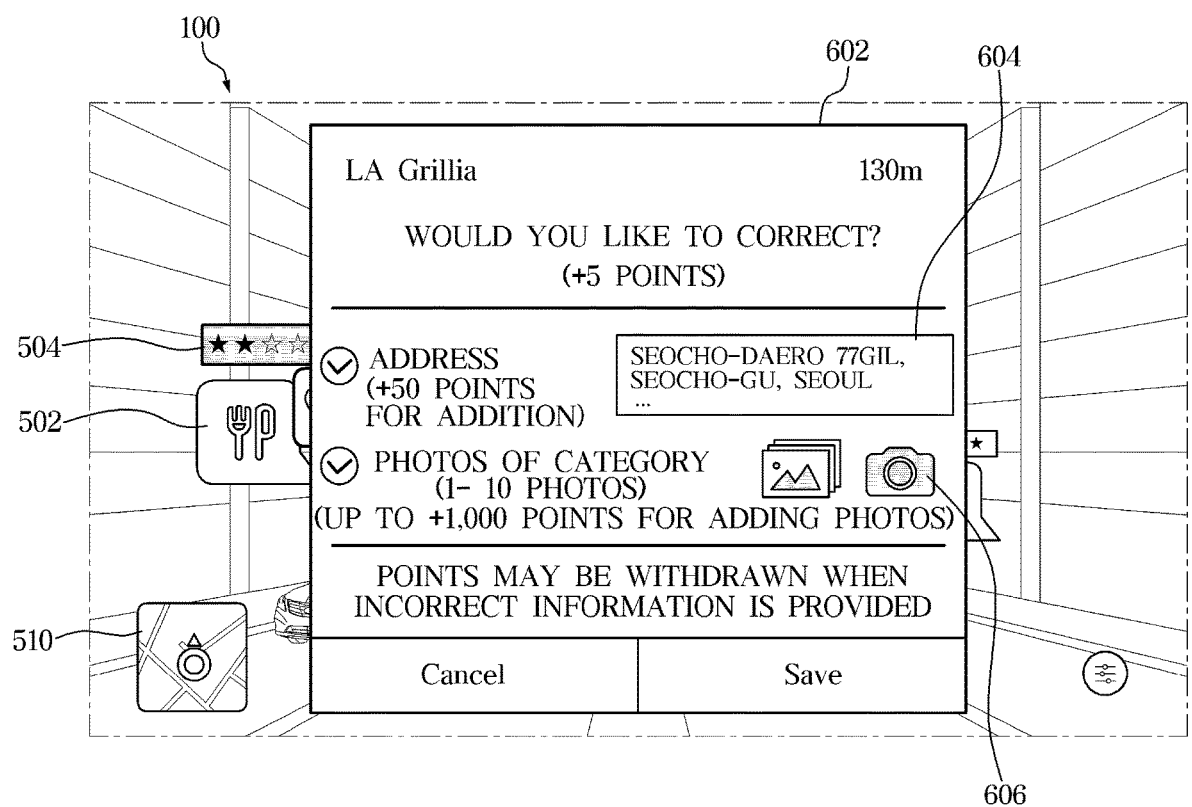
FIG. 6 is a diagram illustrating a second embodiment for improving an accuracy of a POI in a mobile device according to an embodiment.

FIG. 6 is a diagram illustrating a second embodiment for improving an accuracy of a POI in a mobile device according to an embodiment. Similar to FIG. 5, FIG. 6 illustrates an example of position correction of a POI by inducing crowdsourcing (or crowd sourcing) through a predetermined reward.

As shown in FIG. 6, a predetermined point is provided when the position correction is made by inputting an address or a photo of the POI as additional information of the POI. The more specific the address, the more points that are provided. The more photos a user inputs within the predetermined number of photos (e.g., 10 photos), the more points that are provided.

A dialog box 602 for inputting the address or photo may be displayed in a pop-up form, as shown in FIG. 6. The address may be input in an address input bar 604, and the photo may be input through a photo input button 606. When inputting the photo, a user may input the photo that has already been taken or take a photo in real time. When the photo is input by real-time photographing performed based on a tutorial provided by the mobile device 100, more points may be provided as a reward. In this instance, the tutorial is to enable accurate identification of a position of the POI through a photographing result. When taking a photo based on the tutorial, the position of the POI may be identified more accurately, and thus the user may be induced to follow the tutorial through an additional reward.

Also, when incorrect information is provided by the user, a message indicating that points may be withdrawn and further deduction of points may occur as a penalty is displayed in order to induce correct information input.

When information input by the user matches additional information that has already been input by another user, an additional point may be provided to increase the accuracy of input information.

Figure 7:
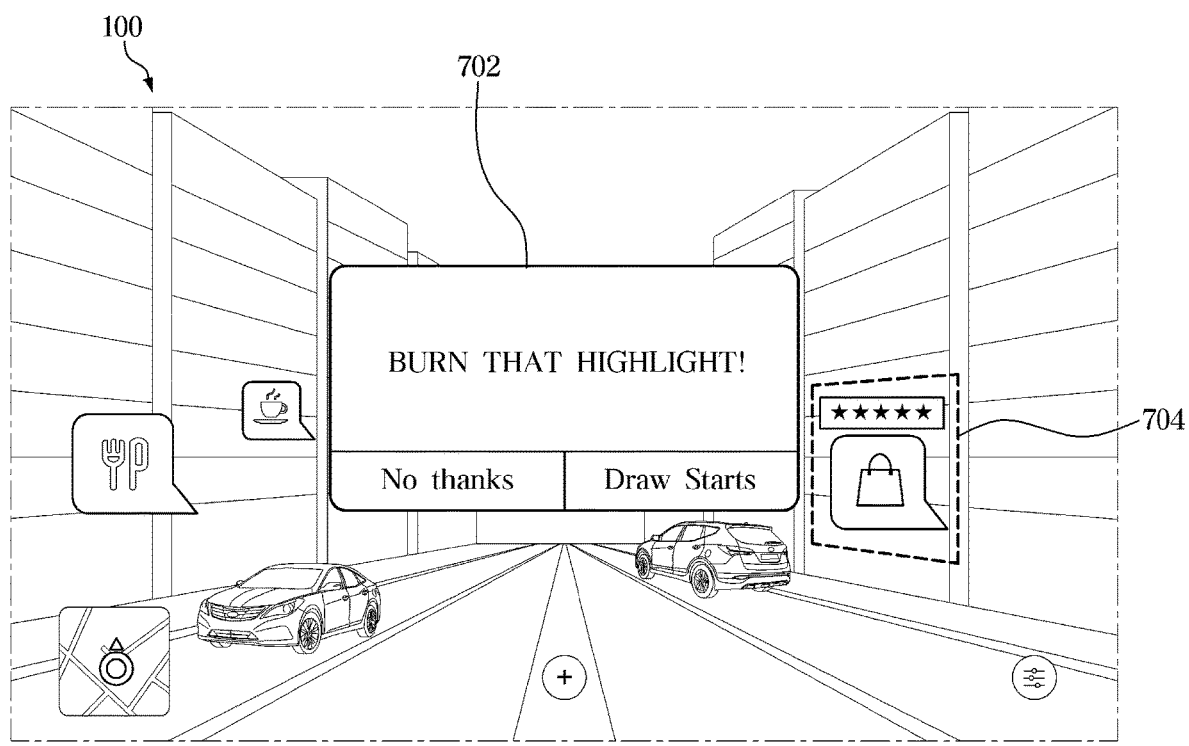
FIG. 7 is a diagram illustrating a third embodiment for improving an accuracy of a POI in a mobile device according to an embodiment.

FIG. 7 is a diagram illustrating a third embodiment for improving an accuracy of a POI in a mobile device according to an embodiment. Specifically, FIG. 7 illustrates an example of position correction of a POI by inducing crowdsourcing (or crowd sourcing) through gamification.

As shown in FIG. 7, when a crowdsourcing editing mode is executed in an AR guide service in the mobile device 100 according to an embodiment, a tag of the POI whose point is low (less than a preset value) among POIs around a current position and points (classified by a star rating) of the POI are displayed (704). Also, as indicated by a reference numeral 702, a guide message for inducing crowdsourcing through gamification may be displayed. It may be guided to additionally provide a predetermined point, when a user deletes the POI and adds a tag or an anchor of a new POI including more accurate location information through gamification.

For example, gamification for information correction of the POI may be removal of a tag or an anchor of a specific POI in a form of a shooting game. Alternatively, the tag or the anchor may be removed from a screen by continuously touching the tag or the anchor of the POI several times within a predetermined period of time (e.g., 5 seconds). The POI from which the tag or the anchor is removed may be corrected by designating a new and more accurate position by the user. Accordingly, existing location information relatively less accurate may be corrected to new and more accurate location information.

Figure 8:
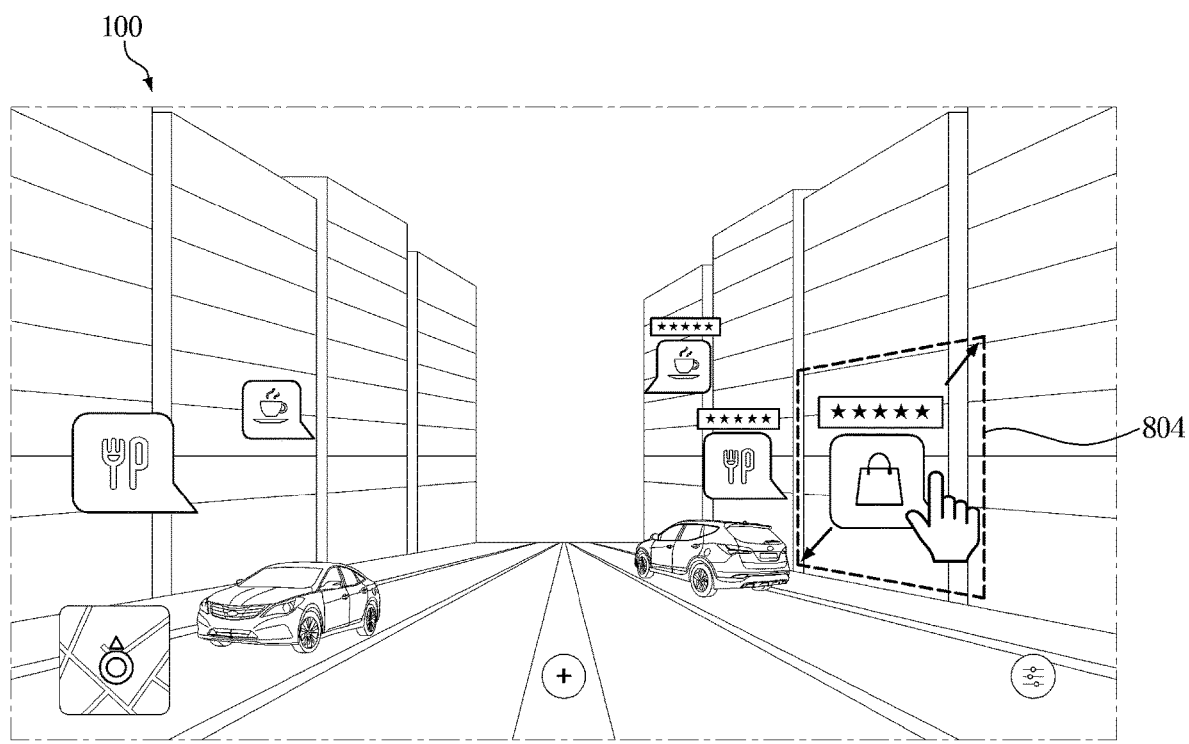
FIG. 8 is a diagram illustrating a fourth embodiment for improving an accuracy of a POI in a mobile device according to an embodiment.

FIG. 8 is a diagram illustrating a fourth embodiment for improving an accuracy of a POI in a mobile device according to an embodiment. In the embodiment of FIG. 8, a user directly inputs the highlight 104 described above with reference to FIG. 1.

As shown in FIG. 8, when the user sets a position of a desired POI by touching a finger image on an AR screen displayed on a display module of the mobile device 100, a highlight 804 is input to a corresponding position. The user may modify a size of the highlight 804 through an expansion gesture using two fingers of the user after setting a position of the highlight 804.

As is apparent from the above, according to the embodiments of the disclosure, the AR-based POI guide device and method can improve accuracy of a position indication of a POI.

Although embodiments have been described for illustrative purposes, those skilled in the art will appreciate that various modifications, additions and substitutions are possible, without departing from the scope and spirit of the disclosure. Therefore, the exemplary embodiments disclosed above and the accompanying drawings are not intended to limit the technical idea, but to describe the technical spirit, and the scope of the technical idea is not limited by the embodiments and the accompanying drawings. The scope of protection shall be interpreted by the following claims, and all technical ideas within the scope of equivalents shall be interpreted as being included in the scope of rights.

What is claimed is:

1. An augmented reality (AR)-based point of interest (POI) guide method, the method comprising:
performing a plane detection with respect to an actual image in an area around a POI;
forming a grid in the area where the plane detection of the actual image is performed;
displaying an anchor and a highlight at a position of the POI based on the grid; and
evaluating an accuracy of the anchor displayed to indicate the position of the POI according to a preset evaluation criterion in order to utilize the accuracy of the displayed anchor for improving the accuracy of POI indications by crowdsourcing,
wherein:
the preset evaluation criterion comprises a feature point set,
the feature point set comprises a number of feature points on a background image of a position where the anchor is created, and
the accuracy with respect to the position of the anchor is evaluated based on the number of feature points.

2. The method of claim 1, further comprising displaying a tag including additional related information for each category of the POI.

3. The method of claim 1, wherein the preset evaluation criterion further comprises a distance, or a plane detection area.

4. The method of claim 3, wherein:
when the preset evaluation criterion comprises the distance, the distance comprises a distance between the position where the anchor is created and a device that performs an anchoring operation; and
the accuracy with respect to the position of the anchor is evaluated based on the distance.

5. The method of claim 3, wherein:
when the preset evaluation criterion comprises the plane detection area, the plane detection area comprises a size where the plane detection is performed with respect to a surrounding area of the anchor; and
the accuracy with respect to the position of the anchor is evaluated based on the plane detection area.

6. The method of claim 3, further comprising:
displaying a search result of the POI; and
displaying an evaluation result according to the preset evaluation criterion as related information of the POI.

7. The method of claim 1, further comprising:
inducing crowdsourcing for a position correction through a predetermined reward,
wherein the position correction is performable by adjusting the position of the anchor by a user in a drag and drop manner.

8. The method of claim 1, further comprising:
inducing crowdsourcing for a position correction through a predetermined reward,
wherein the position correction is performable by directly inputting an address or an image of the POI by a user.

9. The method of claim 1, further comprising:
inducing crowdsourcing for a position correction through a predetermined reward,
wherein the position correction is performable by removing the highlight of the POI through gamification and setting a new position of the POI.

10. An augmented reality (AR)-based point of interest (POI) guide device, the device comprising:
a display module; and
a processor configured to:
perform a plane detection with respect to an actual image in an area around a POI, to form a grid in the area where the plane detection of the actual image is performed,
control the display module to display on an AR-based image an anchor and a highlight at a position of the POI based on the grid, and
evaluate an accuracy of the anchor displayed to indicate the position of the POI according to a preset evaluation criterion in order to utilize the accuracy of the displayed anchor for improving the accuracy of POI indications by crowdsourcing,
wherein:
the preset evaluation criterion is a feature point set;
the feature point set comprises a number of feature points on a background image of a position where the anchor is created; and
the accuracy with respect to the position of the anchor is evaluated based on the number of feature points.

11. The device of claim 10, wherein the display module is configured to display a tag including additional related information for each category of the POI.

12. The device of claim 10, wherein the preset evaluation criterion further comprises a distance, or a plane detection area.

13. The device of claim 12, wherein:
when the preset evaluation criterion comprises the distance, the distance comprises a distance between the position where the anchor is created and the device configured to perform an anchoring operation; and
the accuracy with respect to the position of the anchor is evaluated based on the distance.

14. The device of claim 12, wherein:
when the preset evaluation criterion comprises the area, the area comprises an area where the plane detection is performed with respect to a surrounding area of the anchor; and
the accuracy with respect to the position of the anchor is evaluated based on the plane detection area.

15. The device of claim 12, wherein:
the display module is configured to display a search result of the POI; and
the processor is configured to control the display module to display an evaluation result according to the preset evaluation criterion as related information of the POI.

16. The device of claim 10, wherein;
the processor is configured to induce crowdsourcing for a position correction through a predetermined reward, and
the position correction comprises an adjustment of the position of the anchor by a user in a drag-and-drop manner.

17. The device of claim 10, wherein:
the processor is configured to induce crowdsourcing for a position correction through a predetermined reward, and
the position correction comprises a direct input of an address or an image of the POI by a user.

18. The device of claim 10, wherein the processor is configured to induce crowdsourcing for a position correction through a predetermined reward.

* * * * *